United States Patent
Islam et al.

(10) Patent No.: US 10,966,172 B2
(45) Date of Patent: Mar. 30, 2021

(54) PHYSICAL RANDOM ACCESS CHANNEL (PRACH) CONFIGURATION PERIODICITY EXTENSION FOR BACKHAUL LINKS

(71) Applicant: QUALCOMM Incorporated, San Diego, CA (US)

(72) Inventors: Muhammad Nazmul Islam, Littleton, MA (US); Navid Abedini, Somerset, NJ (US); Tao Luo, San Diego, CA (US); Jianghong Luo, Skillman, NJ (US); Junyi Li, Chester, NJ (US); Luca Blessent, Whitehouse Station, NJ (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/460,700

(22) Filed: Jul. 2, 2019

(65) Prior Publication Data
US 2020/0015180 A1    Jan. 9, 2020

Related U.S. Application Data

(60) Provisional application No. 62/806,490, filed on Feb. 15, 2019, provisional application No. 62/791,311, (Continued)

(51) Int. Cl.
*H04W 56/00* (2009.01)
*H04W 74/08* (2009.01)
(Continued)

(52) U.S. Cl.
CPC ....... *H04W 56/005* (2013.01); *H04L 27/2607* (2013.01); *H04W 72/0446* (2013.01); (Continued)

(58) Field of Classification Search
CPC ......... H04W 72/0426; H04W 72/0446; H04W 74/002; H04W 74/0833–0858; H04W 92/20
See application file for complete search history.

(56) References Cited

U.S. PATENT DOCUMENTS

2010/0034135 A1    2/2010   Kim et al.
2015/0312909 A1*  10/2015   Ohta .................. H04B 7/15507
                                                                370/315
(Continued)

FOREIGN PATENT DOCUMENTS

WO          2011127647 A1    10/2011

OTHER PUBLICATIONS

"3rd Generation Partnership Project; Technical Specification Group Radio Access Network; NR; Physical layer procedures for control (Release 15)", 3GPP Standard; Technical Specification; 3GPP TS 38.213, 3rd Generation Partnership Project (3GPP), Mobile Competence Centre; 650, Route Des Lucioles; F-06921 Sophia-Antipolis Cedex; France, vol. RAN WG1, No. V15.2.0, Jun. 29, 2018 (Jun. 29, 2018), pp. 1-99, XP051474490, [retrieved on Jun. 29, 2018], section 8.1; pp. 32-33, table 8.1_1.

(Continued)

*Primary Examiner* — Pao Sinkantarakorn
(74) *Attorney, Agent, or Firm* — Harrity & Harrity, LLP

(57) ABSTRACT

Various aspects of the present disclosure generally relate to wireless communication. In some aspects, a wireless communication device may receive information that identifies a time offset associated with backhaul physical random access channel (PRACH) resources. The time offset may be different from a time offset that is identified based at least in part on a PRACH configuration index The wireless communication device may identify a set of backhaul PRACH resources based at least in part on the time offset. The wireless communication device may transmit a RACH trans- (Continued)

700

710
Determine periodicity and time offset of backhaul PRACH resources

705
Scaling Factor and Time Offset (e.g., via RMSI, OSI)

New BS

Target BS (Deployed)

720
RACH Transmission using the set of backhaul PRACH resources

715
Identify a set of backhaul PRACH resources based at least in part on periodicity and time offset mission using the identified set of backhaul PRACH resources. Numerous other aspects are provided.

30 Claims, 12 Drawing Sheets

Related U.S. Application Data filed on Jan. 11, 2019, provisional application No. 62/734,165, filed on Sep. 20, 2018, provisional application No. 62/695,599, filed on Jul. 9, 2018.

(51) Int. Cl.
  *H04W 92/04* (2009.01)
  *H04W 80/02* (2009.01)
  *H04W 72/04* (2009.01)
  *H04L 27/26* (2006.01)
  *H04L 5/00* (2006.01)

(52) U.S. Cl.
  CPC ... *H04W 74/0833* (2013.01); *H04W 74/0891* (2013.01); *H04W 80/02* (2013.01); *H04W 92/045* (2013.01); *H04L 5/0007* (2013.01)

(56) References Cited

U.S. PATENT DOCUMENTS

| | | | |
|---|---|---|---|
| 2018/0092139 A1* | 3/2018 | Novlan | H04W 56/001 |
| 2018/0338308 A1* | 11/2018 | Park | H04L 5/0094 |
| 2019/0268947 A1 | 8/2019 | Zhang et al. | |
| 2020/0015274 A1 | 1/2020 | Islam et al. | |
| 2020/0162228 A1* | 5/2020 | Gao | H04W 72/0446 |

OTHER PUBLICATIONS

AT&T: "Overview of physical layer enhancements for IAB", 3GPP Draft; R1-1804662, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 15, 2018 (Apr. 15, 2018), XP051426930, 7 Pages, Retrieved from the Internet: URL:http://www.3gpp.org/ftp/Meetings%5F3GPP%5FSYNC/RAN1/Docs/ [retrieved on Apr. 15, 2018], section 2.1; pp. 2-3.

Fujitsu: "Impact of UL backhaul existence on PRACH slot configuration", 3GPP Draft; R1-091964, 3rd Generation Partnership Project (3GPP), Mobile Competence Centre, 650, Route Des Lucioles, F-06921, Sophia-Antipolis Cedex, France, No. San Francisco, USA; May 2, 2009, May 2, 2009 (May 2, 2009), XP050339436, 5 Pages, [retrieved on May 2, 2009].

International Search Report and Written Opinion—PCT/US2019/040876—ISA/EPO—dated Sep. 13, 2019.

Qualcomm Incorporated: "Remaining Details on RACH Procedure", 3GPP Draft; R1-1720653, 3rd Generation Partnership Project (3GPP), Mobile Competence Centre ; 650, Route Des Lucioles; F-06921 Sophia-Antipolis Cedex; France, vol. RAN WG1, No. Reno, Nevada, USA; Nov. 27, 2017-Dec. 2, 2017, Nov. 18, 2017 (Nov. 18, 2017), XP051370115, 22 Pages, Retrieved from the Internet: URL:http://www.3gpp.org/ftp/tsg%5Fran/WG1%5FRL1/TSGR1%5F91/Docs/ [retrieved on Nov. 18, 2017], section 2.1; pp. 3-4.

3GPP TS 36.211, "3rd Generation Partnership Project; Technical Specification Group Radio Access Network; Evolved Universal Terrestrial Radio Access (E-UTRA) Physical Channels and Modulation (Release 9)", (Mar. 31, 2010), pp. 1-85, V9.1.0.

* cited by examiner

PHYSICAL RANDOM ACCESS CHANNEL (PRACH) CONFIGURATION PERIODICITY EXTENSION FOR BACKHAUL LINKS

CROSS REFERENCE TO RELATED APPLICATION UNDER 35 U.S.C § 119

This application claims priority to U.S. Provisional Application No. 62/695,599, filed on Jul. 9, 2018, entitled "TECHNIQUES AND APPARATUSES FOR PHYSICAL RANDOM ACCESS CHANNEL (PRACH) CONFIGURATION PERIODICITY EXTENSION FOR BACKHAUL LINKS," U.S. Provisional Application No. 62/734,165, filed on Sep. 20, 2018, entitled "PHYSICAL RANDOM ACCESS CHANNEL (PRACH) CONFIGURATION PERIODICITY EXTENSION FOR BACKHAUL LINKS," U.S. Provisional Application No. 62/791,311, filed on Jan. 11, 2019, entitled "PHYSICAL RANDOM ACCESS CHANNEL (PRACH) CONFIGURATION PERIODICITY EXTENSION FOR BACKHAUL LINKS," and U.S. Provisional Application No. 62/806,490, filed on Feb. 15, 2019, entitled "PHYSICAL RANDOM ACCESS CHANNEL (PRACH) CONFIGURATION PERIODICITY EXTENSION FOR BACKHAUL LINKS," which are hereby expressly incorporated by reference herein.

FIELD OF THE DISCLOSURE

Aspects of the present disclosure generally relate to wireless communication, and more particularly to techniques and apparatuses for physical random access channel (PRACH) configuration periodicity extension for backhaul links.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment functionality (UEF) entity, may include identifying a scaling factor associated with determining a periodicity of backhaul physical random access channel (PRACH) resources; and determining, based at least in part on the scaling factor, the periodicity of the backhaul PRACH resources, wherein the periodicity of the backhaul PRACH resources is extended as compared to a periodicity of access PRACH resources.

In some aspects, a UEF entity for wireless communication may include memory and one or more processors operatively coupled to the memory. The memory and the one or more processors may be configured to identify a scaling factor associated with determining a periodicity of backhaul PRACH resources; and determine, based at least in part on the scaling factor, the periodicity of the backhaul PRACH resources, wherein the periodicity of the backhaul PRACH resources is extended as compared to a periodicity of access PRACH resources.

In some aspects, a non-transitory computer-readable medium may store one or more instructions for wireless communication. The one or more instructions, when executed by one or more processors of a UEF entity, may cause the one or more processors to identify a scaling factor associated with determining a periodicity of backhaul PRACH resources; and determine, based at least in part on the scaling factor, the periodicity of the backhaul PRACH resources, wherein the periodicity of the backhaul PRACH resources is extended as compared to a periodicity of access PRACH resources.

In some aspects, an apparatus for wireless communication may include means for identifying a scaling factor associated with determining a periodicity of backhaul PRACH resources; and means for determining, based at least in part on the scaling factor, the periodicity of the backhaul PRACH resources, wherein the periodicity of the backhaul PRACH resources is extended as compared to a periodicity of access PRACH resources.

In some aspects, a method of wireless communication, performed by an ANF entity, may include identifying a scaling factor to be used by a UEF entity in association with determining a periodicity of backhaul physical random access channel (PRACH) resources, wherein the periodicity of the backhaul PRACH resources is to be extended as compared to a periodicity of access PRACH resources; and signaling the scaling factor to the UEF entity.

In some aspects, an ANF entity for wireless communication may include memory and one or more processors operatively coupled to the memory. The memory and the one or more processors may be configured to identify a scaling factor to be used by a UEF entity in association with determining a periodicity of backhaul physical random access channel (PRACH) resources, wherein the periodicity of the backhaul PRACH resources is to be extended as compared to a periodicity of access PRACH resources; and signal the scaling factor to the UEF entity.

In some aspects, a non-transitory computer-readable medium may store one or more instructions for wireless communication. The one or more instructions, when executed by one or more processors of an ANF entity, may cause the one or more processors to identify a scaling factor to be used by a UEF entity in association with determining a periodicity of backhaul physical random access channel (PRACH) resources, wherein the periodicity of the backhaul PRACH resources is to be extended as compared to a periodicity of access PRACH resources; and signal the scaling factor to the UEF entity.

In some aspects, an apparatus for wireless communication may include means for identifying a scaling factor to be used by a UEF entity in association with determining a periodicity of backhaul physical random access channel (PRACH) resources, wherein the periodicity of the backhaul PRACH resources is to be extended as compared to a periodicity of access PRACH resources; and means for signaling the scaling factor to the UEF entity.

In some aspects, a method of wireless communication, performed by an access node functionality (ANF) entity, may include configuring a time offset of backhaul physical random access channel (PRACH) resources; and transmitting information that identifies the time offset, wherein the time offset is different from a time offset that is identified based at least in part on a PRACH configuration index.

In some aspects, an ANF entity for wireless communication may include memory and one or more processors operatively coupled to the memory. The memory and the one or more processors may be configured to configure a time offset of backhaul physical random access channel (PRACH) resources; and transmit information that identifies the time offset, wherein the time offset is different from a time offset that is identified based at least in part on a PRACH configuration index.

In some aspects, a non-transitory computer-readable medium may store one or more instructions for wireless communication. The one or more instructions, when executed by one or more processors of an ANF entity, may cause the one or more processors to configure a time offset of backhaul physical random access channel (PRACH) resources; and transmit information that identifies the time offset, wherein the time offset is different from a time offset that is identified based at least in part on a PRACH configuration index.

In some aspects, an apparatus for wireless communication may include means for configuring a time offset of backhaul physical random access channel (PRACH) resources; and means for transmitting information that identifies the time offset, wherein the time offset is different from a time offset that is identified based at least in part on a PRACH configuration index.

In some aspects, a method of wireless communication, performed by a UEF entity, may include receiving information that identifies a time offset associated with backhaul physical random access channel (PRACH) resources, wherein the time offset is different from a time offset that is identified based at least in part on a PRACH configuration index; identifying a set of backhaul PRACH resources based at least in part on the time offset; and transmitting a RACH transmission using the identified set of back backhaul PRACH resources.

In some aspects, a UEF entity for wireless communication may include memory and one or more processors operatively coupled to the memory. The memory and the one or more processors may be configured to receive information that identifies a time offset associated with backhaul physical random access channel (PRACH) resources, wherein the time offset is different from a time offset that is identified based at least in part on a PRACH configuration index; identify a set of backhaul PRACH resources based at least in part on the time offset; and transmit a RACH transmission using the identified set of back backhaul PRACH resources.

In some aspects, a non-transitory computer-readable medium may store one or more instructions for wireless communication. The one or more instructions, when executed by one or more processors of a UEF entity, may cause the one or more processors to receive information that identifies a time offset associated with backhaul physical random access channel (PRACH) resources, wherein the time offset is different from a time offset that is identified based at least in part on a PRACH configuration index; identify a set of backhaul PRACH resources based at least in part on the time offset; and transmit a RACH transmission using the identified set of back backhaul PRACH resources.

In some aspects, an apparatus for wireless communication may include means for receiving information that identifies a time offset associated with backhaul physical random access channel (PRACH) resource, wherein the time offset is different from a time offset that is identified based at least in part on a PRACH configuration index s; means for identifying a set of backhaul PRACH resources based at least in part on the time offset; and means for transmitting a RACH transmission using the identified set of back backhaul PRACH resources.

Aspects generally include a method, apparatus, system, computer program product, non-transitory computer-readable medium, user equipment, base station, wireless communication device, and processing system as substantially described herein with reference to and as illustrated by the accompanying drawings, specification, and appendices.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
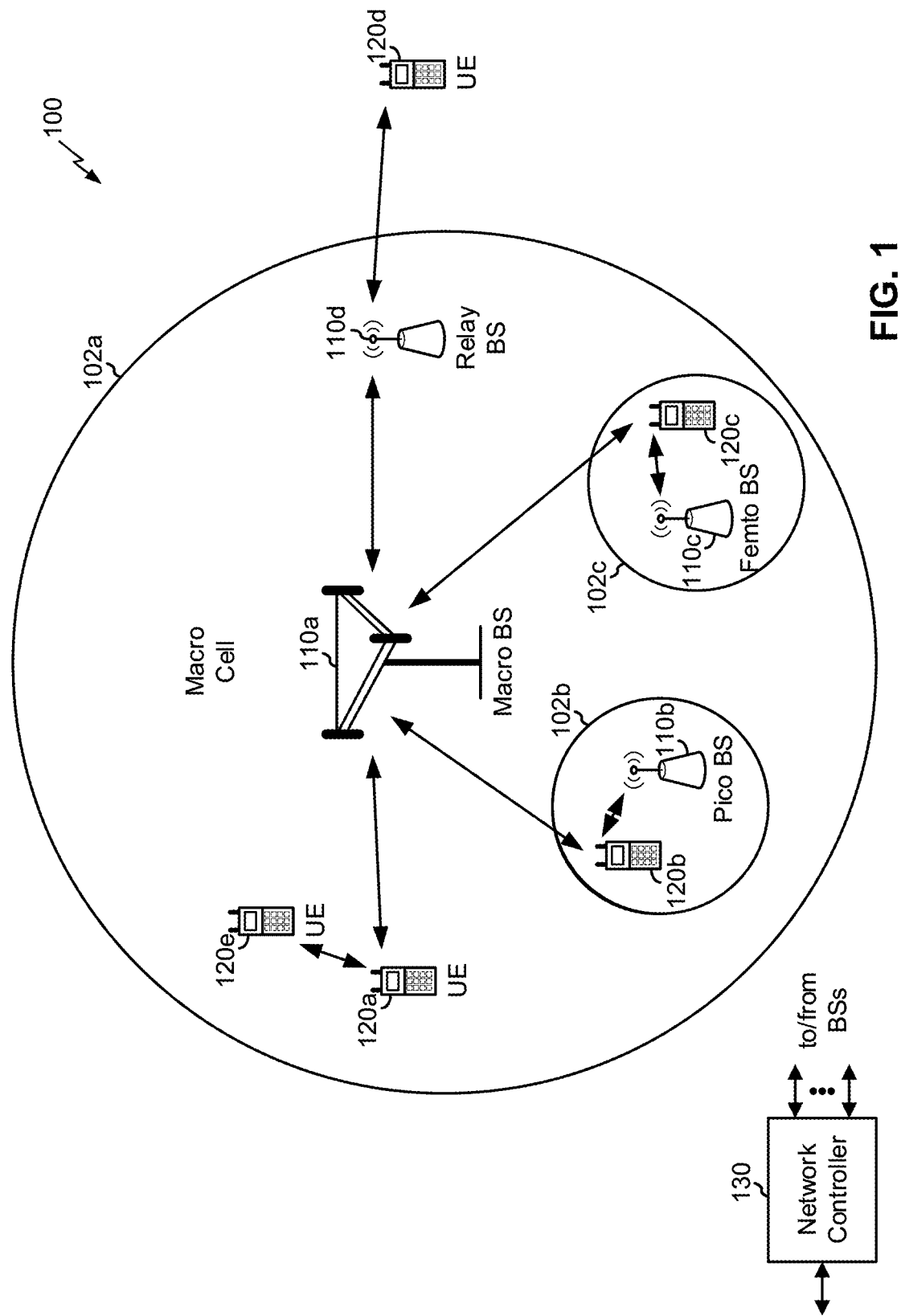
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
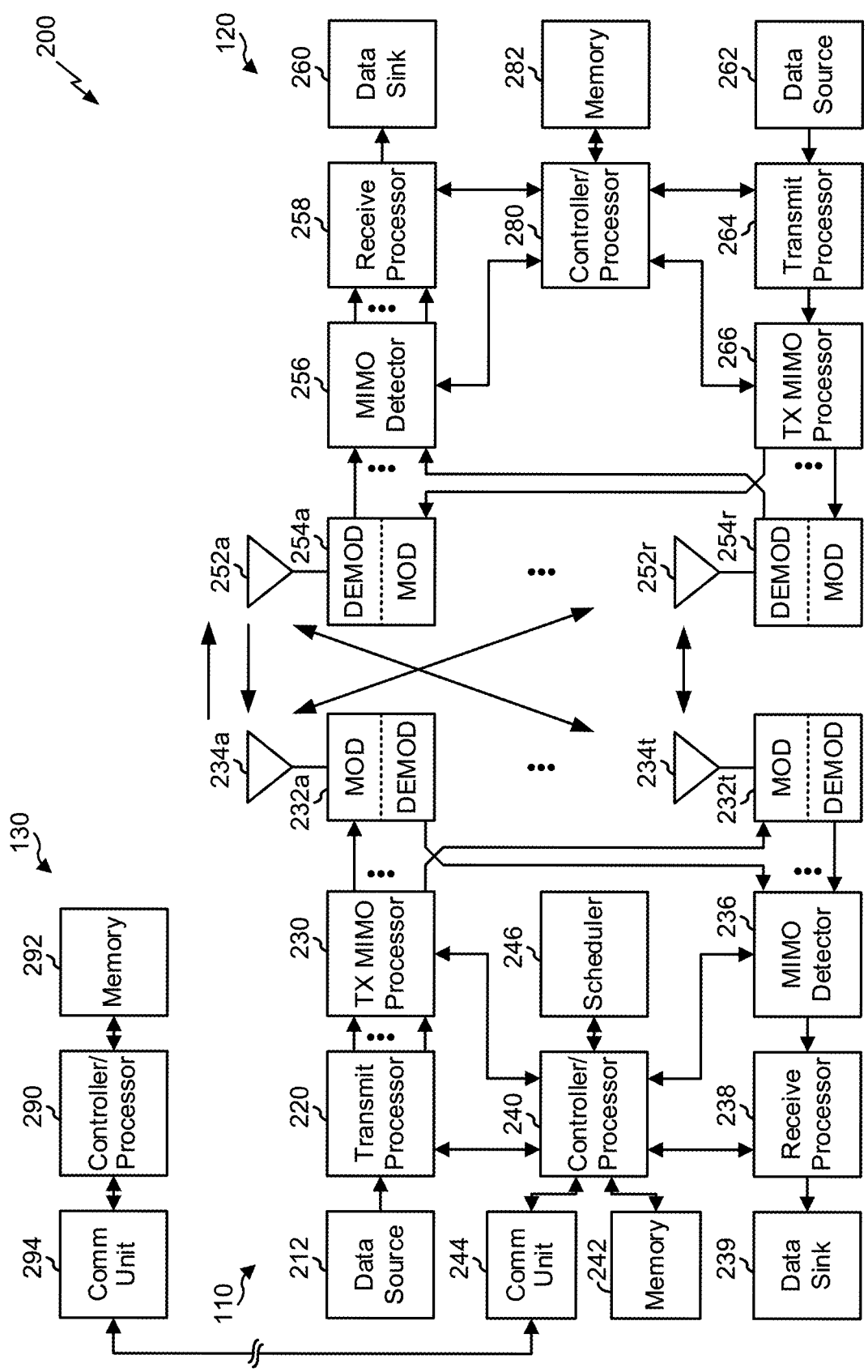
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with physical random access channel (PRACH) configuration periodicity extension for backhaul links, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, process 1100 of FIG. 11, and/or other processes as described herein. Memories 242 and 282 may store data and program codes for base station 110 and UE 120, respectively. A scheduler 246 may schedule UEs for data transmission on the downlink and/or uplink.

In some aspects, base station 110 (e.g., a base station that operates with UE functionality (UEF)) may include means for identifying a scaling factor associated with determining a periodicity of backhaul PRACH resources; means for determining, based at least in part on the scaling factor, the periodicity of the backhaul PRACH resources, wherein the periodicity of the backhaul PRACH resources is extended as compared to a periodicity of access PRACH resources; and/or the like. In some aspects, such means may include one or more components of base station 110 described in connection with FIG. 2.

In some aspects, a base station 110 (e.g., a base station that operates with access node functionality (ANF)) may include means for identifying a scaling factor to be used by a UEF entity (e.g., a base station 110 with UEF) in association with determining a periodicity of backhaul PRACH resources, wherein the periodicity of the backhaul PRACH resources is to be extended as compared to a periodicity of access PRACH resources; means for signaling the scaling factor to the UEF entity; and/or the like. In some aspects, such means may include one or more components of base station 110 described in connection with FIG. 2.

In some aspects, a base station 110 (e.g., a base station 110 that operates with ANF) may include means for configuring a time offset of backhaul PRACH resources; means for transmitting information that identifies the offset, wherein the time offset is different from a time offset that is identified based at least in part on a PRACH configuration index; and/or the like. In some aspects, such means may include one or more components of base station 110 described in connection with FIG. 2.

In some aspects, a base station 110 (e.g., a base station 110 that operates with UEF) may include means for receiving information that identifies a time offset associated with backhaul PRACH resources, wherein the time offset is different from a time offset that is identified based at least in part on a PRACH configuration index; means for identifying a set of backhaul PRACH resources based at least in part on the time offset; means for transmitting a RACH transmission using the identified set of backhaul PRACH resources; and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3A:
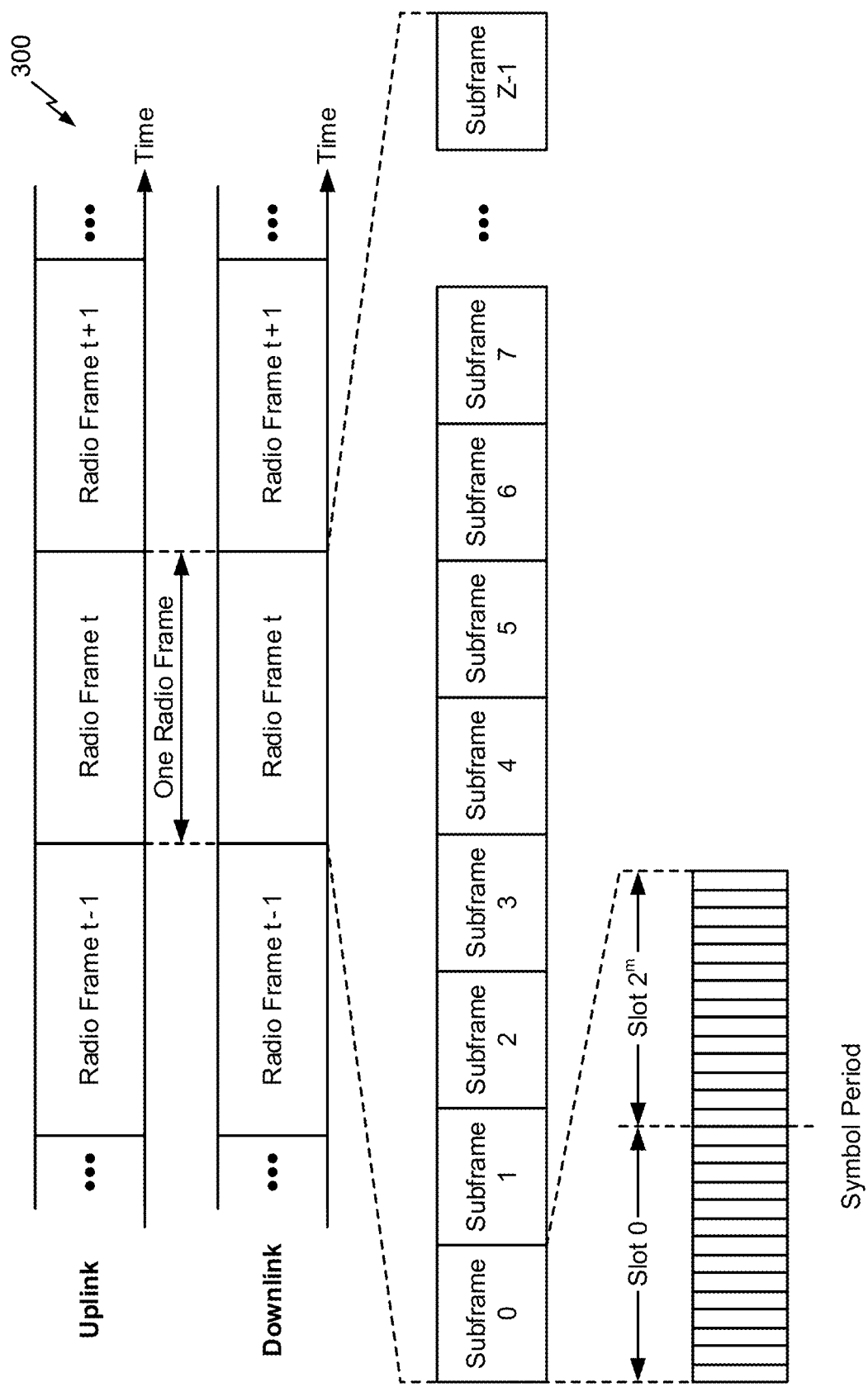
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
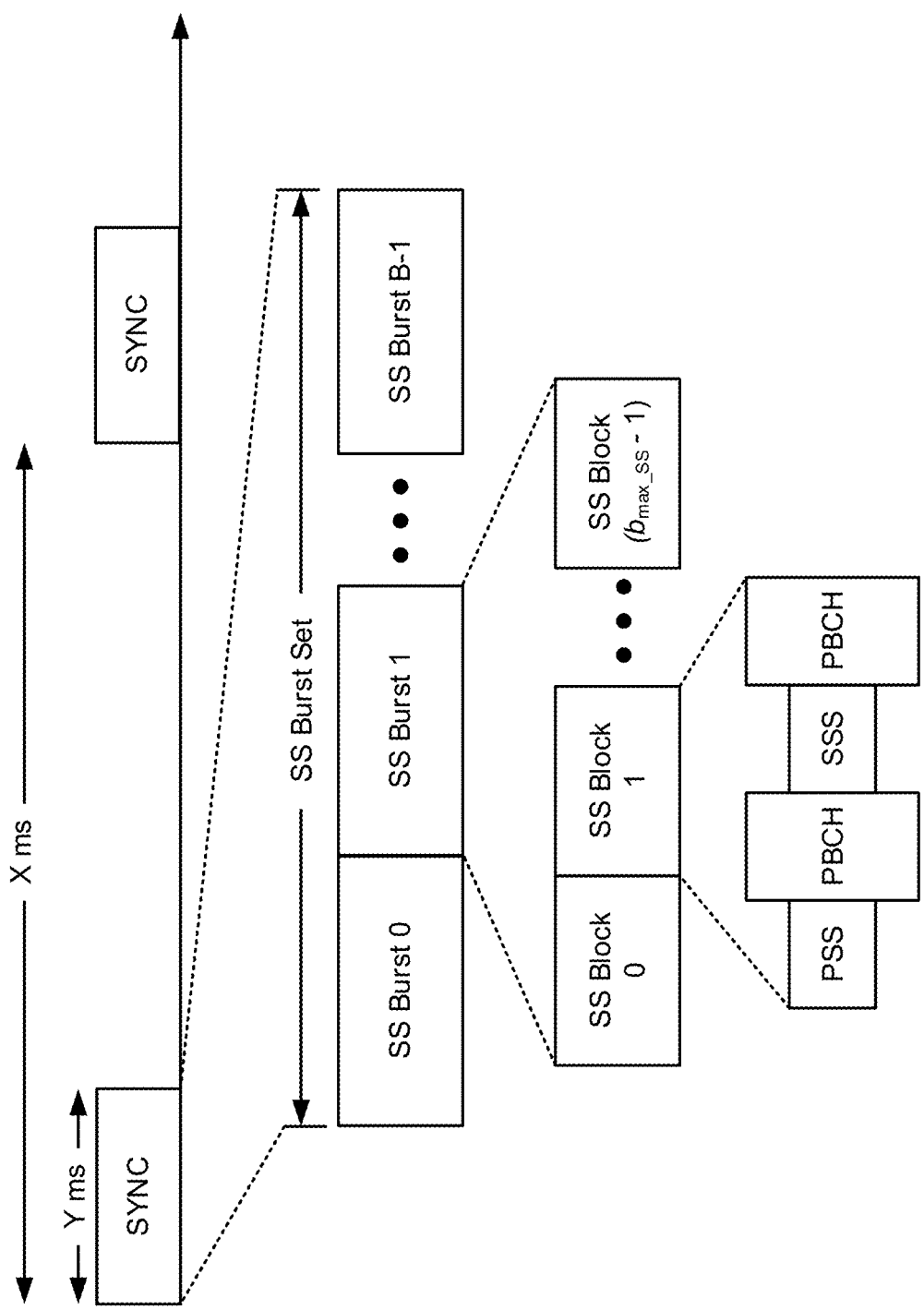
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples are possible and may differ from what was described with regard to FIGS. 3A and 3B.

Figure 4:
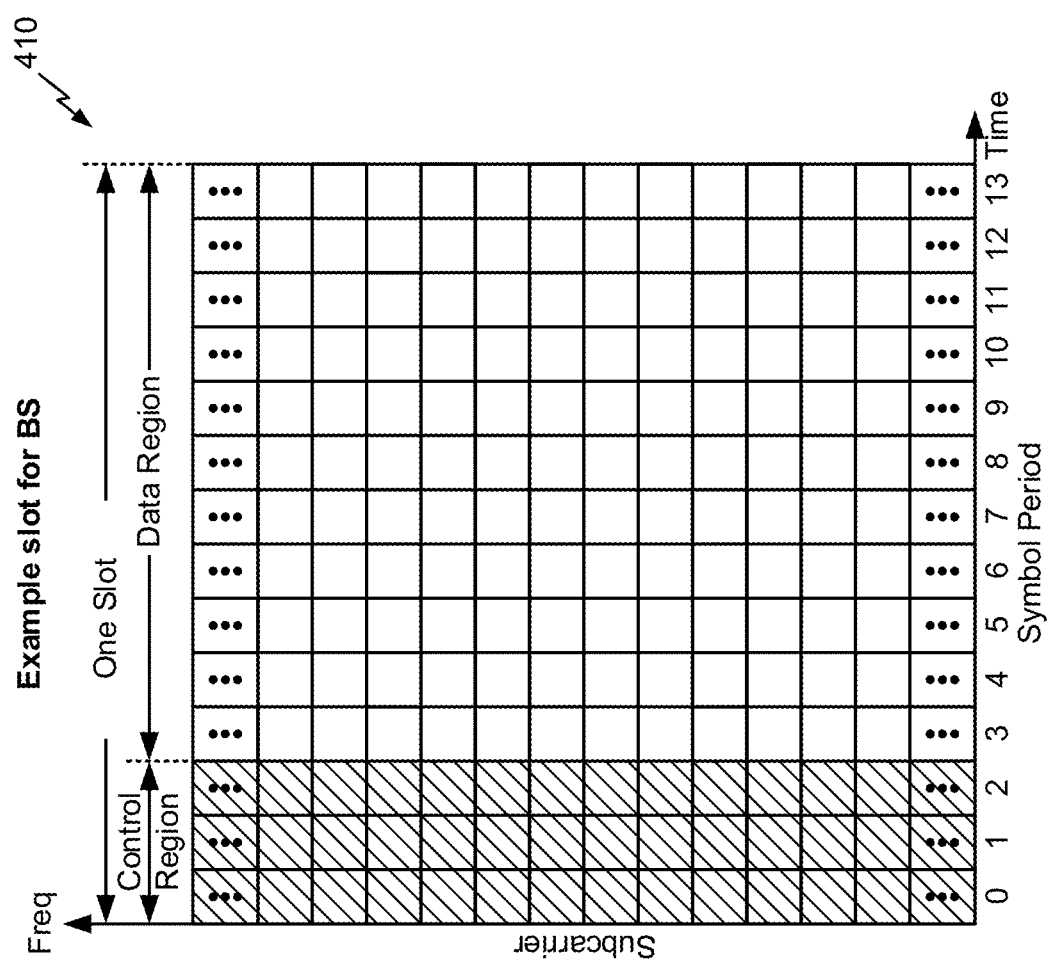
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
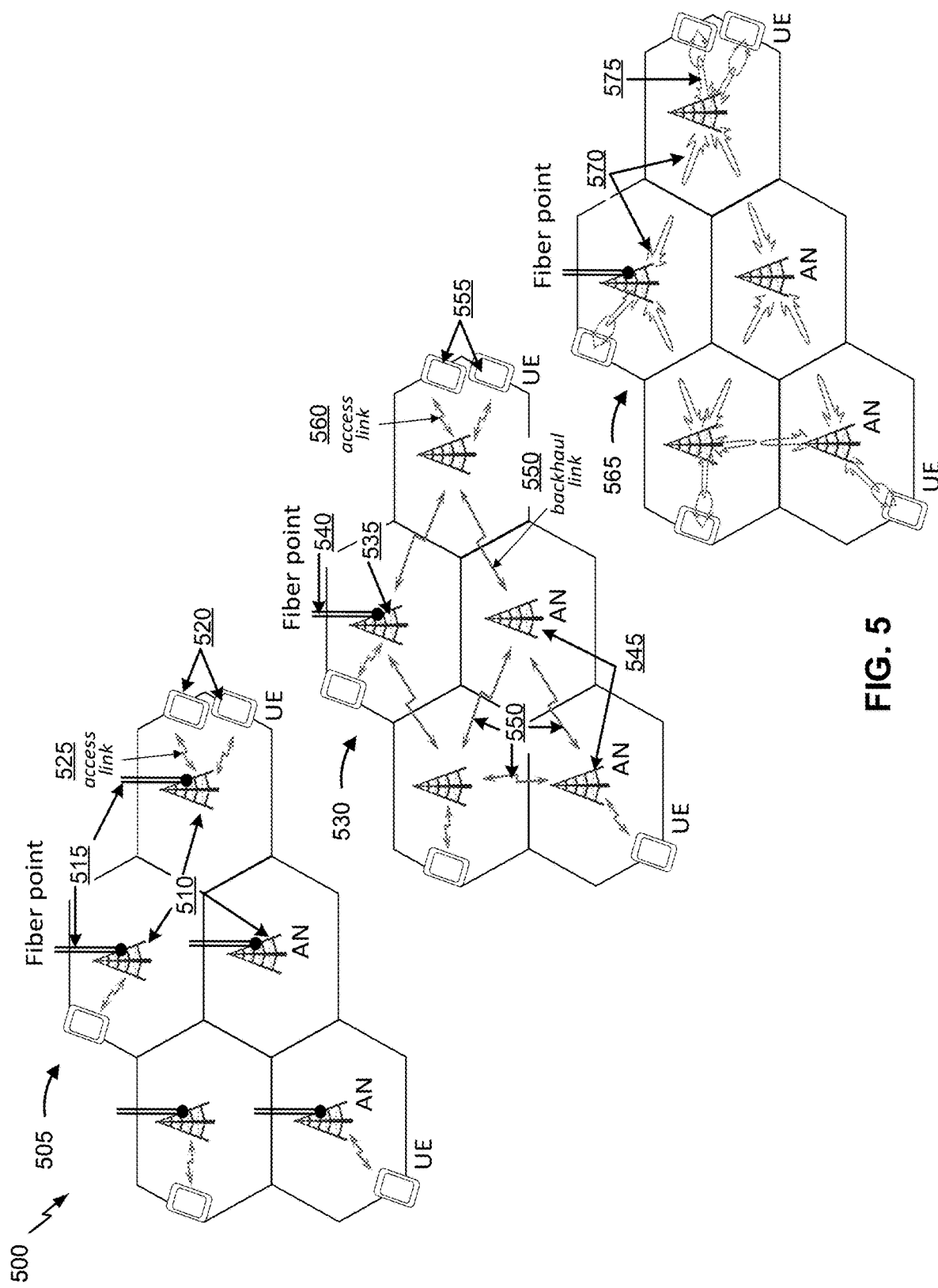
FIG. 5 is a diagram illustrating examples of radio access networks, in accordance with various aspects of the present disclosure.

FIG. 5 is a diagram illustrating examples 500 of radio access networks, in accordance with various aspects of the disclosure.

As shown by reference number 505, a traditional (e.g., 3G, 4G, LTE, etc.) radio access network may include multiple base stations 510 (e.g., access nodes (AN)), where each base station 510 communicates with a core network via a wired backhaul link 515, such as a fiber connection. A base station 510 may communicate with a UE 520 via an access link 525, which may be a wireless link. In some aspects, a base station 510 shown in FIG. 5 may correspond to a base station 110 shown in FIG. 1. Similarly, a UE 520 shown in FIG. 5 may correspond to a UE 120 shown in FIG. 1.

As shown by reference number 530, a radio access network may include a wireless backhaul network, where at least one base station is an anchor base station 535 that communicates with a core network via a wired backhaul link 540, such as a fiber connection. The wireless backhaul network may include one or more non-anchor base stations 545 that communicate directly with or indirectly with (e.g., via one or more non-anchor base stations 545) the anchor base station 535 via one or more backhaul links 550 to form a backhaul path to the core network for carrying backhaul traffic. Backhaul link 550 may be a wireless link. Anchor base station(s) 535 and/or non-anchor base station(s) 545 may communicate with one or more UEs 555 via access links 560, which may be wireless links for carrying access traffic. In some aspects, an anchor base station 535 and/or a non-anchor base station 545 shown in FIG. 5 may correspond to a base station 110 shown in FIG. 1. Similarly, a UE 555 shown in FIG. 5 may correspond to a UE 120 shown in FIG. 1.

As shown by reference number 565, in some aspects, a radio access network that includes a wireless backhaul network may utilize millimeter wave technology and/or directional communications (e.g., beamforming, precoding, and/or the like) for communications between base stations and/or UEs (e.g., between two base stations, between two UEs, and/or between a base station and a UE). For example, the wireless backhaul links 570 between base stations may use millimeter waves to carry information and/or may be directed toward a target base station using beamforming, precoding, and/or the like. Similarly, the wireless access links 575 between a UE and a base station may use millimeter waves and/or may be directed toward a target wireless node (e.g., a UE and/or a base station). In this way, inter-link interference may be reduced.

As indicated above, FIG. 5 is provided as an example. Other examples are possible and may differ from what was described with regard to FIG. 5.

Figure 6:
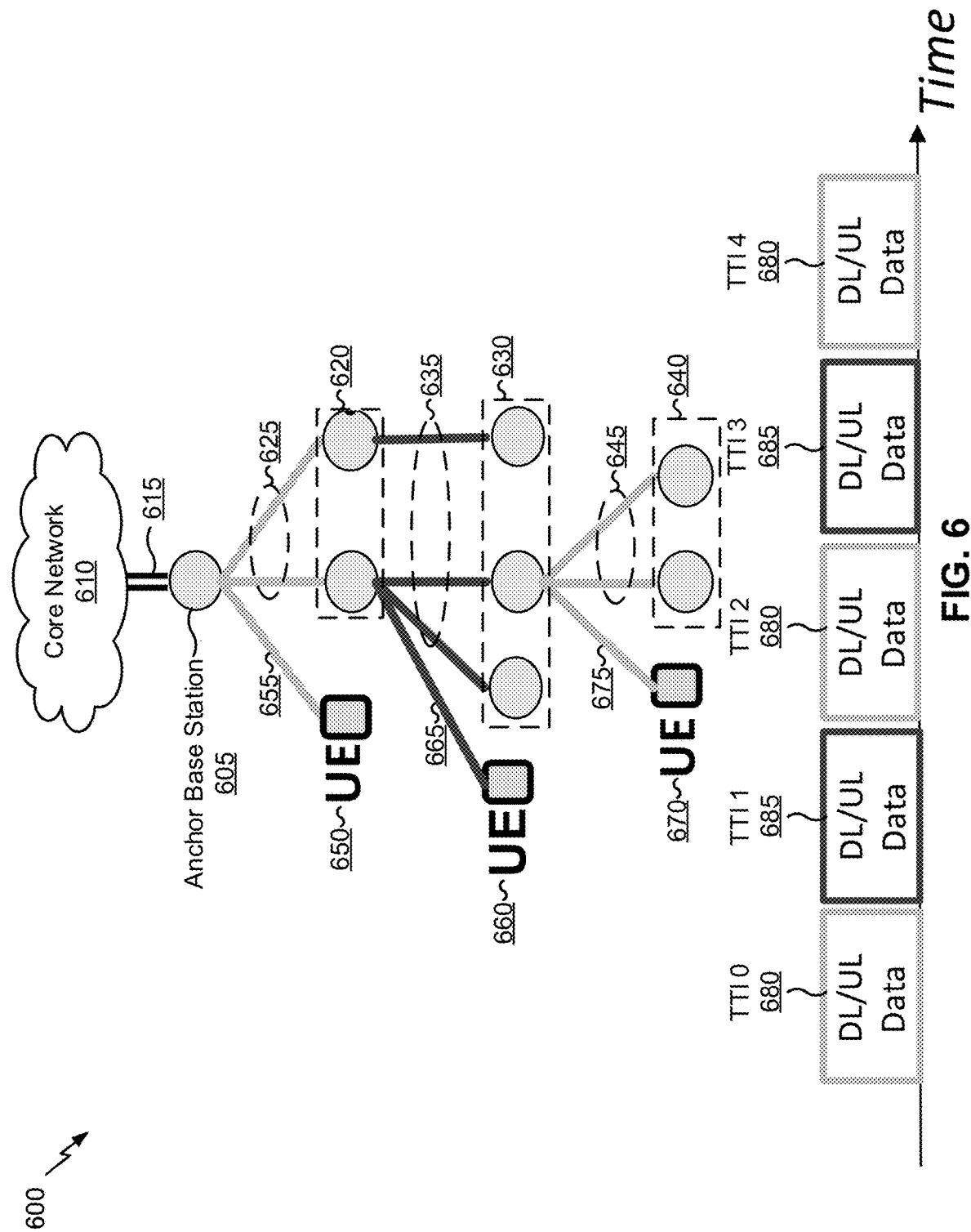
FIG. 6 is a diagram illustrating an example of resource partitioning in a wireless backhaul network, in accordance with various aspects of the present disclosure.

FIG. 6 is a diagram illustrating an example 600 of resource partitioning in a wireless backhaul network, in accordance with various aspects of the disclosure.

As shown in FIG. 6, an anchor base station 605 may be connected to a core network 610 via a wired backhaul link 615, such as a fiber connection. As further shown, non-anchor base stations 620 may communicate directly with anchor base station 605 via wireless backhaul links 625. In some aspects, one or more non-anchor base stations may communicate indirectly with anchor base station 605 via multiple wireless backhaul links (e.g., via one or more other non-anchor base stations). For example, and as shown, a first set of non-anchor base stations 630 may communicate indirectly with anchor base station 605 via a wireless backhaul link 635 and a wireless backhaul link 625. As further shown, a second set of non-anchor base stations 640 may communicate indirectly with anchor base station 605 via a wireless backhaul link 645, a wireless backhaul link 635, and a wireless backhaul link 625.

As further shown, a UE 650 may communicate with anchor base station 605 via a wireless access link 655, a UE 660 may communicate with a non-anchor base station 620 via a wireless access link 665, and a UE 670 may communicate with a non-anchor base station 630 via a wireless access link 675.

In some aspects, an index (e.g., a color index) may be assigned to a wireless link and/or a wireless node (e.g., a base station or a UE). The index may indicate one or more resources allocated to a wireless node for communication via the wireless link. For example, and as shown, a first index 680 may be associated with transmission time intervals (TTIs) 0, 2, and 4, and a second index 685 may be associated with TTIs 1 and 3. As indicated by light gray lines in FIG. 6, the first index 680 may be assigned to wireless backhaul links 625 and 645 and wireless access links 655 and 675. Thus, information may be transmitted over these links during TTIs 0, 2, and 4, and not during TTIs 1 and 3. Similarly, and as indicated by dark gray lines in FIG. 6, the second index 685 may be assigned to wireless backhaul links 635 and wireless access links 665. Thus, information may be transmitted over these links during TTIs 1 and 3, and not during TTIs 0, 2, and 4. In this way, wireless nodes may coordinate communication such that a wireless node is not configured to transmit and receive data at the same time.

While the resources are shown as time resources, additionally, or alternatively, an index may be associated with a frequency resource. Furthermore, the configuration of base stations and UEs in FIG. 6 is shown as an example, and other examples are possible.

As indicated above, FIG. 6 is provided as an example. Other examples are possible and may differ from what was described with regard to FIG. 6.

In an integrated access and backhaul (IAB) network, such as those described in association with FIGS. 5 and 6, a base station is typically connected, via a wireless backhaul link, to a nearest neighbor base station. However, in some cases, the base station may need to connect to a base station that is a comparatively further distance away than the nearest neighbor base station (e.g., for load balancing in a scenario where the nearest neighbor base station is using an amount of resources for access transmissions such that the nearest neighbor base station cannot transport backhaul transmissions). Thus, backhaul random access channel (RACH) design may need to support different (e.g., higher) round trip times and link gains as compared to access RACH design.

Further, in the IAB network, a given base station may receive both backhaul RACH transmissions and access RACH transmissions. In some cases, differences between link gains of backhaul RACH and access RACH may exist. Such differences may result from, for example, different numbers of transmit antennas used for backhaul RACH as compared to access RACH, different transmission powers used for backhaul RACH as compared to access RACH, different amounts of hand and/or body loss experienced by backhaul RACH as compared to access RACH, different path losses experienced by backhaul RACH as compared to access RACH, and/or the like.

Additionally, a number of supported cyclic shifts for each Zadoff-Chu (ZC) root sequence associated with RACH transmission should be designed such that a gap between neighbouring cyclic shifts can handle a desired round trip distance. For example, assume that an IAB network is to be designed such that base stations that are separated by M (M≥1) hops are to be able to transmit RACH to one another. In order to handle such a case, a number of supported cyclic shifts for each ZC root sequence in backhaul RACH is [1/(2×M)]th of that of access RACH. As a particular example, if an IAB network is to be designed such that base stations that are separated by 3 hops are to be able to transmit RACH to one another, then a number of supported cyclic shifts for each ZC root sequence in backhaul RACH is ⅙th (e.g., 1/(2×3)=⅙th) of that of access RACH. Hence, if access links and backhaul links use the same time-frequency resources for RACH transmission, supportable cyclic shifts for RACH transmission decrease significantly. This requires the IAB network to use more ZC root sequences in order to support a given number of RACH preambles (e.g., 64 RACH preambles) in one RACH occasion, which causes higher interference across RACH transmissions in neighbouring cells.

This also leads to a trade-off when the IAB network configures access RACH preambles and backhaul RACH preambles in the same time-frequency resources. For example, if the network configures RACH preamble format B4 (e.g., with 12 repetitions and a 3.8 microsecond (μs) cyclic prefix duration with 120 kilohertz (kHz) subcarrier spacing (SCS)) in order to satisfy an access link budget requirement, the network can only support up to 1.14 kilometers (km) of round trip time distance in backhaul links. Conversely, if the network configures RACH preamble format C2 (e.g., with 4 repetitions and a 8.33 μs cyclic prefix duration with 120 kHz SCS) in order to meet a 2.5 km round trip time distance in backhaul links, the network loses approximately 5 decibels (dB) in access RACH link budget. In other words, if access links and backhaul links are to use the same time-frequency resources for RACH transmissions, the network has to trade-off between supporting higher distance in backhaul links and higher gain in access links.

Due to the above issues, a NR IAB network may be designed to support configuring access RACH occasions differently from backhaul RACH occasions (e.g., such that access RACH occasions and backhaul RACH occasions use different time-frequency resources). Here, a RACH occasion denotes a set of time-frequency resources for RACH transmissions, and a given set of time-frequency resources may be for contention based RACH or contention free RACH.

Notably, the capability to differently configure access RACH occasions and backhaul RACH occasions may require additional signaling by a given base station, while the given base station also needs to configure other/additional RACH occasions for backhaul RACH. However, since a given IAB node requiring a backhaul connection (e.g., a base station) will be relatively static (i.e., have low mobility) in most cases, configuration of contention based backhaul RACH occasions as frequently as contention based access RACH occasions may result in wasted network resources (e.g., since contention based backhaul RACH transmissions may be occurring less frequently). Hence, it may be advantageous for the IAB network to configure contention-based backhaul RACH occasions more infrequently than contention-based access RACH occasions.

Some aspects described herein describe identifying a scaling factor associated with determining a periodicity of backhaul physical RACH (PRACH) resources, and identifying the periodicity of the backhaul PRACH resources based at least in part on the scaling factor. In some aspects, the periodicity of the backhaul PRACH resources is extended as compared to a periodicity of access PRACH resources, as described below.

Further, a node in an IAB network cannot transmit PRACH to a parent node of the IAB node simultaneously with receiving RACH from a child node of the IAB node. Additionally, the PRACH resources among adjacent hops should be orthogonalized (e.g., in order to prevent the same set of resources from being used for communications with the parent node and the child node). However, this reduces flexibility of the IAB network to select PRACH configuration indices. For example, a pair of configuration indices that identify the same slot number for PRACH resources (e.g., a pair of configuration indices with overlapping PRACH resource slots) may not be selected in adjacent IAB network hops.

Some aspects described herein describe an IAB network configured to explicitly configure a system frame number (SFN) periodicity and a time offset of RACH resources of IAB nodes in order to orthogonalize RACH resources across adjacent IAB network hops.

Figure 7:
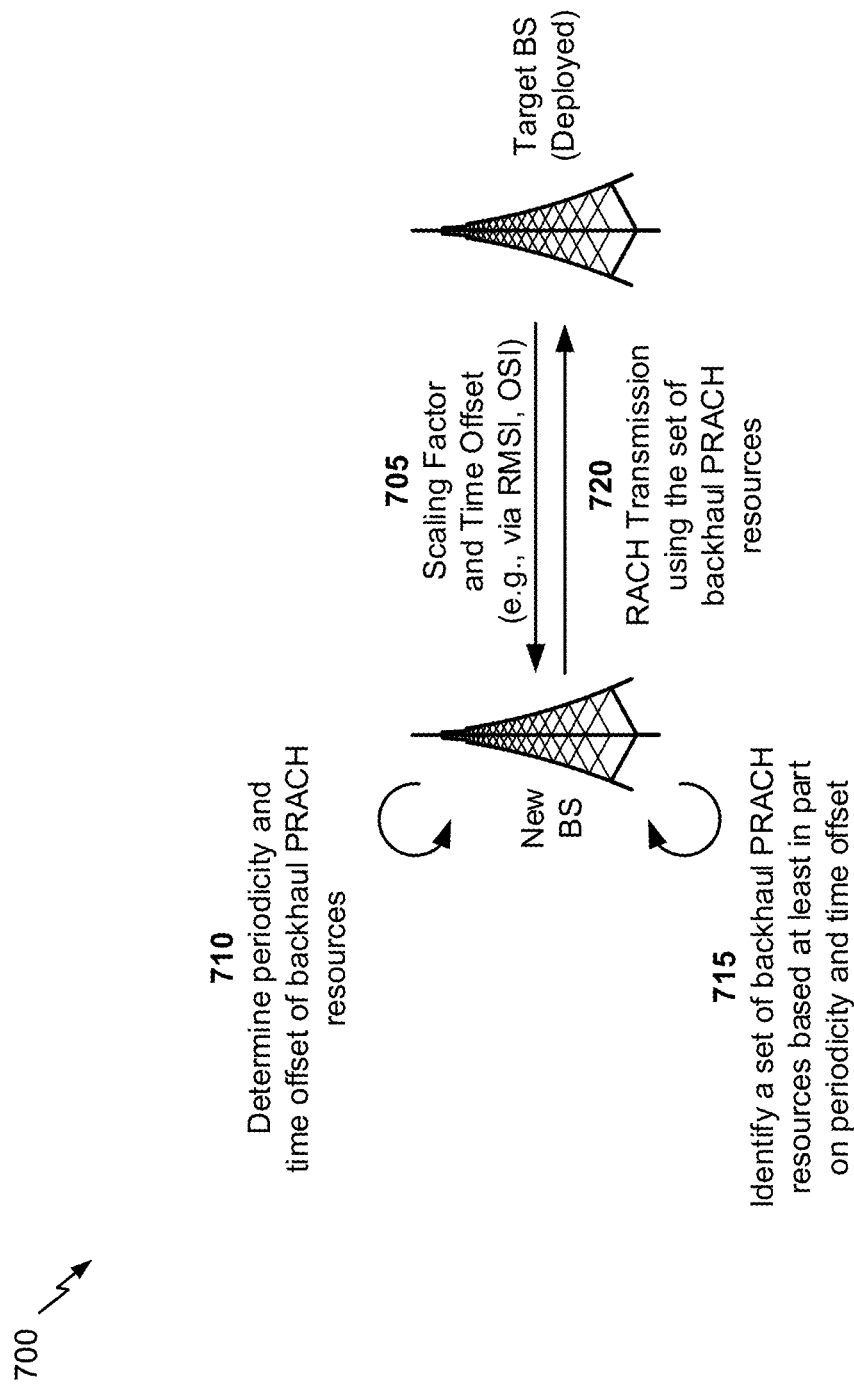
FIG. 7 is a diagram illustrating an example of determining a periodicity and a time offset of backhaul physical RACH resources, in accordance with various aspects of the present disclosure.

FIG. 7 is a diagram illustrating an example 700 of determining a periodicity of backhaul physical RACH (PRACH) resources based at least in part on a scaling factor, and determining a time offset of the backhaul PRACH resources, in accordance with various aspects of the present disclosure. A new base station and/or a target base station, as described in association with FIG. 7, may each correspond to a respective base station 110, non-anchor base station 545, non-anchor base station 620/630/640, and/or the like. In some aspects, the new base station operates with a UE functionality (UEF). A wireless communication device that operates with UEF is herein referred to as a UEF entity. For example, the new base station may be used in a mobile termination (MT) of an IAB node (e.g., the new base station may be a scheduled entity for UE/MT of IAB). In some aspects, the target base station operates with an access node functionality (ANF). A wireless communication device that operates with ANF is herein referred to as an ANF entity. For example, the target base station may be a scheduler for a base station 110.

As noted in FIG. 7, the target base station is deployed within a wireless backhaul network (e.g., an IAB network), while the new base station is a base station that is being deployed in the wireless backhaul network (e.g., a base station that is not presently connected to the wireless backhaul network). For the purposes of example 700, assume that the new base station is to identify a set of backhaul PRACH resources in which to transmit a random access message (e.g., MSG1) for initiating a RACH procedure associated with establishing a connection, via a wireless backhaul link, with the target base station.

As shown by reference number 705, the new base station may determine a scaling factor and/or a time offset. The scaling factor may include a value (e.g., an integer value) based at least in part on which a periodicity of backhaul PRACH resources can be determined. In some aspects, the periodicity of the backhaul PRACH resources, to be determined by the new base station, is extended as compared to a periodicity of access PRACH resources, as described herein.

The time offset includes a time offset of PRACH resources. In some aspects, the IAB network (e.g., the target base station or another wireless communication device associated with the IAB network) may (e.g., explicitly) configure the time offset of the backhaul PRACH resources, and may transmit information that identifies the time offset to the new base station, as indicated in FIG. 7. In some aspects, the time offset may be identified in terms of a number of radio frames, a number of slots, a number of subframes, a number of symbols, and/or the like. In some aspects, the time offset may be different from an time offset associated with a PRACH configuration index. In such a case, the time offset overrides the time offset that is associated with the PRACH configuration index, as described below.

In some aspects, as indicated in FIG. 7, the new base station may determine the scaling factor and/or the time offset based at least in part on the scaling factor and/or the time offset, respectively, being signaled to the new base station (e.g., by the target base station). In some aspects, the scaling factor and/or the time offset may be signaled to the new base station via remaining minimum system information (RMSI), other system information (OSI), downlink control information (DCI), a medium access control (MAC) control element (MAC-CE), radio resource control (RRC) signaling, a handover command, and/or the like.

In some aspects, the scaling factor may be a fixed value. For example, in some aspects, the scaling factor may be defined in a specification associated with the IAB network, and this fixed value scaling factor may be configured on the new base station in accordance with the specification (e.g., such that information that identifies the scaling factor is stored or accessible by the new base station, without a need for the scaling factor to be signaled by the target base station).

As further shown in FIG. 7, and by reference number 710, the new base station may determine the periodicity of the backhaul PRACH resources based at least in part on the scaling factor.

In some aspects, the periodicity of the backhaul PRACH resources is associated with identifying a radio frame location of a set of backhaul PRACH resources (e.g., a set of resources that may be used by the new base station in order to transmit a backhaul RACH transmission).

In some aspects, the new base station may determine the periodicity of the backhaul PRACH resources based on a PRACH configuration index. For example, the new base station may determine a PRACH configuration index based at least in part on information carried in a system information block (e.g., SIB2) received by the new base station. The new base station may then determine (e.g., based on a PRACH configuration index table configured on the new base station) a periodicity of PRACH resources that corresponds to the PRACH configuration index. Here, the new base station may determine the periodicity of the backhaul PRACH resources based at least in part on applying the scaling factor to the periodicity of PRACH resources that corresponds to the PRACH configuration index.

As a particular example, assume that the new base station determines a scaling factor 8 and is signaled a PRACH configuration index that indicates that a PRACH resource periodicity of 16 (e.g., indicating that PRACH resources occur every 16 radio frames). Here, the new base station may determine the periodicity of the backhaul PRACH resources based on multiplying the scaling factor and the periodicity identified by the PRACH configuration index. Thus, in this example, the new base station may determine that backhaul PRACH resources occur every 128 radio frames (e.g., 8×16=128). The new base station may determine particular locations of the backhaul PRACH resources, within a given radio frame, based at least in part on other information associated with the PRACH configuration index. Notably, as illustrated here, the periodicity of the backhaul RACH resources (e.g., occurring in every 128 radio frames) is extended as compared to the periodicity of access RACH resources (e.g., when the periodicity of access PRACH resources is to match the periodicity indicated by the PRACH configuration index). In this way, the scaling factor may be used to extend the periodicity of backhaul PRACH resources through signaling of a single value (i.e., the scaling factor), thereby reducing signaling overhead and without a need to reconfigure and/or redesign a PRACH configuration index table, while still allowing for differently configured backhaul PRACH resources.

In some aspects, the periodicity of the backhaul PRACH resources is associated with repetition of a mapping pattern that associates synchronization signal blocks with PRACH resources. For example, the periodicity may identify an interval of time at which a mapping pattern, associating synchronization signal blocks with respective PRACH resources, is to repeat. In some aspects, the interval of time at which the mapping pattern is to repeat may be determined based at least in part on the scaling factor and a PRACH configuration period, as described below.

Generally, mapping synchronization signal blocks to PRACH resources is needed in order to allow a wireless communication device (e.g., a UE, a new base station) to indicate a synchronization signal block preferred by the wireless communication device. For example, a given synchronization signal block may correspond to a particular base station beam. Thus, by transmitting the RACH transmission (e.g., MSG1) in particular RACH resources that map to a preferred synchronization signal block, the wireless communication device indicates a base station beam to the target base station (e.g., such that the target base station can transmit a random access response (MSG2) using the indicated beam). However, the mapping pattern associated with mapping synchronization signal blocks to PRACH resources should repeat with an identifiable periodicity. Otherwise, the wireless communication device will be unable to determine which synchronization signal blocks are associated with particular PRACH resources and, thus, would be unable to indicate a preferred synchronization signal block.

Typically, the mapping pattern should repeat after an association period. The association period is equal to a PRACH configuration period multiplied by an integer number (e.g., a value that identifies a number of PRACH configuration periods). The association period used is equal to a minimum value, of a set of values, that satisfies a full mapping for transmitted synchronization signal blocks. For example, assume that a PRACH configuration period is 10 milliseconds (ms) and the set of possible values includes 1, 2, 4, 8, and 16. Here, the synchronization signal block to PRACH resource mapping pattern may repeat after every 10 ms (e.g., 10 ms×1=10 ms), every 20 ms (e.g., 10 ms×2=20 ms), every 40 ms (e.g., 10 ms×4=40 ms), every 80 ms (e.g., 10 ms×8=80 ms), or every 160 ms (e.g., 10 ms×16=160 ms). The repetition period for the mapping pattern may be selected as the minimum of these five durations that allows a full set of synchronization signal blocks to be mapped to respective PRACH resources. For example, assume the target base station transmits 32 synchronization signal blocks, and that 9 PRACH resources are configured within a given 10 ms PRACH configuration period. Thus, 9 PRACH resources are configured within 10 ms (e.g., one PRACH configuration period), 18 PRACH resources are configured within 20 ms (e.g., two PRACH configuration periods), and 36 PRACH resources are configured within 40 ms (e.g., four PRACH configuration periods). As such, a full synchronization signal block to PRACH resource mapping requires at least a four PRACH configuration periods, indicating that the mapping pattern should repeat after every 40 ms. Hence, the association period in this case is 40 ms.

In the case of backhaul PRACH resources, the repetition of the mapping pattern may be determined based at least in part on the scaling factor. For example, the new base station may determine the repetition of the mapping pattern (e.g., an interval at which the mapping pattern is to repeat) based at least in part on the scaling factor, a PRACH configuration period, and an integer value. For example, the new base station may determine the interval at which the mapping pattern is to repeat as an amount of time equal to a product of the scaling factor, the PRACH configuration period, and the integer value.

In some aspects, the repetition of the mapping pattern may be determined in accordance with the following table:

| PRACH configuration period (ms) | Association period(number of PRACH configuration periods) |
| --- | --- |
| 10 | {1, 2, 4, 8, 16} × S |
| 20 | {1, 2, 4, 8} × S |
| 40 | {1, 2, 4} × S |
| 80 | {1, 2} × S |
| 160 | {1} × S | where S represents the scaling factor by which the product of the PRACH configuration period and a given integer value is multiplied.

As a particular example, assume that the new base station determines a scaling factor of 4, a PRACH configuration period of 20 ms, and a set of integer values including 1, 2, 4, and 8. Here, the new base station may determine that the synchronization signal block to PRACH resource mapping pattern may repeat every 80 ms (e.g., 20 ms×1×4=80 ms), every 160 ms (e.g., 20 ms×2×4=160 ms), every 320 ms (e.g., 20 ms×4×4=320 ms), or every 640 ms (e.g., 20 ms×8×4=640 ms). Here, the repetition period for the mapping pattern may be selected as the minimum of these five durations that allows a full set of synchronization signal blocks to be mapped to respective backhaul PRACH resources, as described above.

In some aspects, since RACH resources may get invalidated due to the presence of synchronization signal blocks or downlink resources, the association period may change over time. For example, during a first time period (e.g., from 0 ms to 40 ms) the association period might be 40 ms. However, during a second time period (e.g., from 40 ms to 80 ms), the association period can be, for example, equal to 10 ms or 20 ms. In order to reduce complexity arising from the irregularity of the association period over time, an "association pattern period" may be configured. The association pattern period is a period after which the synchronization signal block to RACH mapping is guaranteed to repeat, irrespective of how RACH resources get invalidated. In some aspects, the association pattern period may be equal to 160 ms in an access network.

In some aspects, the new base station may be configured such that the mapping pattern is guaranteed to repeat after an amount of time equal to a product of a fixed time value, configured on the new base station, and the scaling factor. In some aspects, the fixed time value may be, for example, 160 ms. Thus, in some aspects, the new base station may be configured such that the association pattern repeats (at most) every 160×S ms, where S represents the scaling factor. Hence, the association pattern period might 160×S ms in backhaul networks.

Thus, in some aspects, the association period and/or the association pattern period, associated with mapping synchronization signal blocks to PRACH resources, may be determined based at least in part on the scaling factor. For example, in some aspects, the association period may be determined such that a pattern between PRACH occasions and synchronization signal blocks repeats at an amount of time that is equal to or less than a product of a PRACH configuration period and the scaling factor. As another example, in some aspects, the association pattern period may be determined based at least in part on the scaling factor, a PRACH configuration period associated with the association period, and an integer value associated with the association period.

In this way, the scaling factor may be used to extend the periodicity of synchronization signal block to PRACH resource mapping pattern through signaling of a single value (i.e., the scaling factor), thereby reducing signaling overhead while still allowing for differently configured backhaul PRACH resources.

As further shown by reference number 710, the new base station may determine the time offset of the backhaul PRACH resources. For example, the new base station may determine the time offset based at least in part on receiving the information that identifies the time offset from the target base station. In some aspects, the time offset may be in a range from zero to the periodicity of the backhaul PRACH resources. In some aspects, the time offset can be configured by the target base station or another wireless communication device associated with the IAB network, as described above. In some aspects, the time offset may be identified in terms of a number of radio frames, a number of slots, a number of subframes, a number of symbols, and/or the like. For example, the time offset may include a subframe level offset, such as a subframe level offset in a range from 0 to 127. As another example, the time offset may include a slot level offset, such as a slot level offset in a range from 0 to 39 (e.g., when slot indexing is defined in terms of 60 kHz numerology), or a range from 0 to 9 (e.g., when slot indexing is defined in terms of 15 kHz numerology). In some aspects, the time offset is used to time division multiplex random access channel (RACH) resources across adjacent hops of a backhaul network.

In some aspects, the time offset may be different from an time offset that is identified based at least in part on a PRACH configuration index. For example, the new base station may determine a PRACH configuration index based at least in part on information carried in a system information block (e.g., SIB2) received by the new base station, as described above. Here, the time offset determined by the new base station (e.g., based on being signaled by the target base station) may be different from an time offset identified based at least in part on the PRACH configuration index (e.g., an time offset identified based at least in part on the PRACH configuration index table). In some aspects, the time offset may override the time offset that is identified based at least in part on the PRACH configuration index.

As shown by reference number 715, the new base station may identify a set of backhaul PRACH resources based at least in part on the periodicity of the backhaul PRACH resources and/or based at least in part on the time offset. For example, the new base station may, based at least in part on the periodicity and the time offset, identify a radio frame location of a particular set of backhaul PRACH resources that, according to the mapping pattern, correspond to a particular synchronization signal block. As shown by reference number 720, the new base station may then transmit a RACH transmission (e.g., MSG1) using the set of identified backhaul PRACH resources.

As indicated above, FIG. 7 is provided as an example. Other examples are possible and may differ from what was described with respect to FIG. 7.

Figure 8:
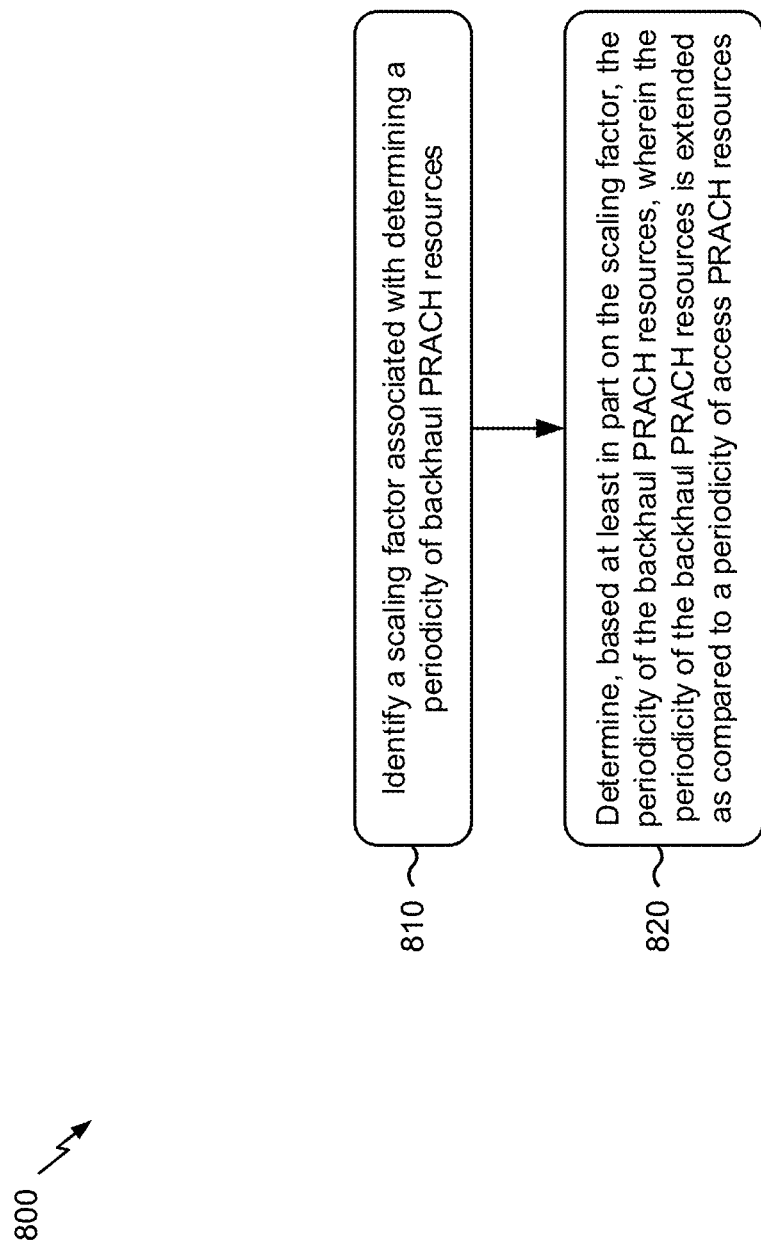
FIG. 8 is a diagram illustrating an example process performed, for example, by a user equipment functionality (UEF) entity, in accordance with various aspects of the present disclosure.

FIG. 8 is a diagram illustrating an example process 800 performed, for example, by a UEF entity, in accordance with various aspects of the present disclosure. Example process 800 is an example where a UEF entity (e.g., base station 110 with UEF, UE 120) determines, based at least in part on a scaling factor, a periodicity of a backhaul PRACH resources, wherein the periodicity of the backhaul PRACH resources is extended as compared to a periodicity of access PRACH resources.

As shown in FIG. 8, in some aspects, process 800 may include identifying a scaling factor associated with determining a periodicity of backhaul physical random access channel (PRACH) resources (block 810). For example, the UEF entity (e.g., using transmit processor 220/264, controller/processor 240/280, and/or the like), may identify a scaling factor associated with determining a periodicity of backhaul PRACH resources, as described above.

As shown in FIG. 8, in some aspects, process 800 may include determining, based at least in part on the scaling factor, the periodicity of the backhaul PRACH resources, wherein the periodicity of the backhaul PRACH resources is extended as compared to a periodicity of access PRACH resources (block 820). For example, the UEF entity (e.g., using transmit processor 220/264, controller/processor 240/280, and/or the like), may determine, based at least in part on the scaling factor, the periodicity of the backhaul PRACH resources, wherein the periodicity of the backhaul PRACH resources is extended as compared to a periodicity of access PRACH resources, as described above.

Process 800 may include additional aspects, such as any single aspect or any combination of aspects described below and/or in connection with one or more other processes described elsewhere herein.

Process 800 may include additional aspects, such as any single aspect or any combination of aspects described below and/or in connection with one or more other processes described elsewhere herein.

In a first aspect, the periodicity of the backhaul PRACH resources is associated with identifying a radio frame location of a set of backhaul PRACH resources.

In a second aspect, alone or in combination with the first aspect, the periodicity of the backhaul PRACH resources is determined based at least in part on the scaling factor and a PRACH configuration index.

In a third aspect, alone or in combination with one or more of the first and second aspects, the periodicity of the backhaul PRACH resources is determined based at least in part on multiplying the scaling factor and a periodicity of PRACH resources associated with the PRACH configuration index.

In a fourth aspect, alone or in combination with one or more of the first through third aspects, the PRACH resources associated with the PRACH configuration index are applicable for PRACH transmission in an access network.

In a fifth aspect, alone or in combination with one or more of the first through fourth aspects, a range of the scaling factor is based at least in part on the periodicity of the PRACH resources associated with the PRACH configuration index.

In a sixth aspect, alone or in combination with one or more of the first through fifth aspects, an association period, associated with mapping synchronization signal blocks to PRACH resources, is determined based at least in part on the scaling factor.

In a seventh aspect, alone or in combination with one or more of the first through sixth aspects, the association period is determined such that a pattern between PRACH occasions and synchronization signal blocks repeats at an amount of time that is equal to or less than a product of a PRACH configuration period and the scaling factor.

In an eighth aspect, alone or in combination with one or more of the first through seventh aspects, an association pattern period, associated with mapping synchronization signal blocks to PRACH resources, is determined based at least in part on the scaling factor.

In a ninth aspect, alone or in combination with one or more of the first through eighth aspects, the association pattern period is determined based at least in part on the scaling factor, a PRACH configuration period associated with an association period, and an integer value associated with the association period.

In a tenth aspect, alone or in combination with one or more of the first through ninth aspects, the association pattern period is determined such that a pattern between PRACH occasions and synchronization signal blocks repeats at an amount of time that is equal to or less than a product of a fixed time value and the scaling factor.

In an eleventh aspect, alone or in combination with one or more of the first through tenth aspects, the fixed time value is 160 milliseconds.

In a twelfth aspect, alone or in combination with one or more of the first through eleventh aspects, the scaling factor is signaled to the UEF entity via at least one of: remaining minimum system information; other system information; downlink control information; a medium access control (MAC) control element; radio resource control signaling; or a handover command.

In a thirteenth aspect, alone or in combination with one or more of the first through twelfth aspects, the scaling factor is used in association with orthogonalizing RACH occasions across adjacent hops of a backhaul network.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
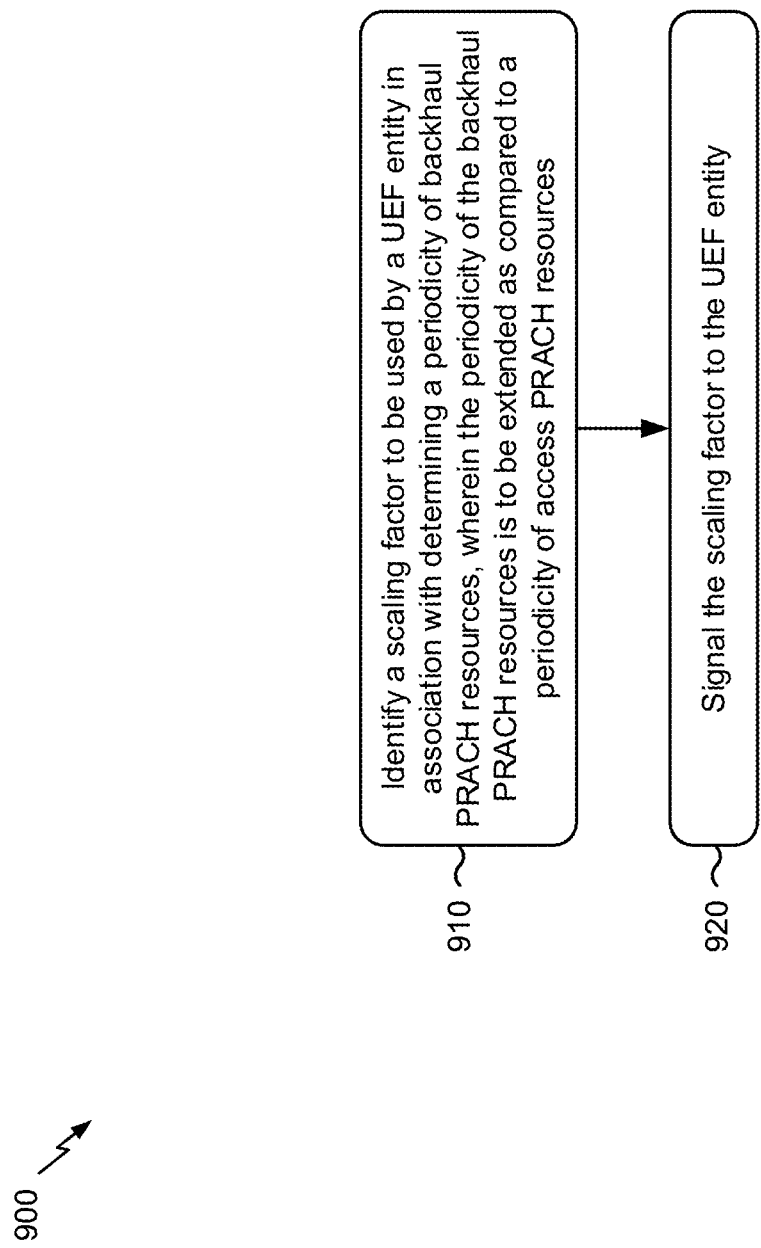
FIG. 9 is a diagram illustrating an example process performed, for example, by an access node functionality (ANF) entity, in accordance with various aspects of the present disclosure.

FIG. 9 is a diagram illustrating an example process 900 performed, for example, by an access node functionality (ANF) entity, in accordance with various aspects of the present disclosure. Example process 1000 is an example where an ANF entity (e.g., base station 110 with ANF) signals a scaling factor, associated with determining a periodicity of a backhaul PRACH resources, wherein the periodicity of the backhaul PRACH resources is to be extended as compared to a periodicity of access PRACH resources.

As shown in FIG. 9, in some aspects, process 900 identifying a scaling factor to be used by a user equipment functionality (UEF) entity in association with determining a periodicity of backhaul physical random access channel (PRACH) resources (block 910). For example, the ANF entity (e.g., using controller/processor 240, and/or the like), may identify a scaling factor to be used by a UEF entity (e.g., a base station 110 with UEF) in association with determining a periodicity of backhaul PRACH resources, as described above. In some aspects, the periodicity of the backhaul PRACH resources is to be extended as compared to a periodicity of access PRACH resources.

As further shown in FIG. 9, in some aspects, process 900 may include signaling the scaling factor to the UEF entity (block 920). For example, the ANF entity (e.g., using transmit processor 220, controller/processor 240, and/or the like) may signal the scaling factor to the UEF entity, as described above.

Process 900 may include additional aspects, such as any single aspect or any combination of aspects described below and/or in connection with one or more other processes described elsewhere herein.

In a first aspect, the periodicity of the backhaul PRACH resources is associated with identifying a radio frame location of a set of backhaul PRACH resources.

In a second aspect, alone or in combination with the first aspect, the periodicity of the backhaul PRACH resources is to be determined based at least in part on the scaling factor and a PRACH configuration index.

In a third aspect, alone or in combination with one or more of the first and second aspects, the periodicity of the backhaul PRACH resources is to be determined based at least in part on multiplying the scaling factor and a periodicity of PRACH resources associated with the PRACH configuration index.

In a fourth aspect, alone or in combination with one or more of the first through third aspects, the PRACH resources associated with the PRACH configuration index are applicable for PRACH transmission in an access network.

In a fifth aspect, alone or in combination with one or more of the first through fourth aspects, a range of the scaling factor is based at least in part on the periodicity of the PRACH resources associated with the PRACH configuration index.

In a sixth aspect, alone or in combination with one or more of the first through fifth aspects, an association period, associated with mapping synchronization signal blocks to PRACH resources, is determined based at least in part on the scaling factor.

In a seventh aspect, alone or in combination with one or more of the first through sixth aspects, the association period is determined such that a pattern between PRACH occasions and synchronization signal blocks repeats at an amount of time that is equal to or less than a product of a PRACH configuration period and the scaling factor.

In an eighth aspect, alone or in combination with one or more of the first through seventh aspects, an association pattern period, associated with mapping synchronization signal blocks to PRACH resources, is to be determined based at least in part on the scaling factor.

In a ninth aspect, alone or in combination with one or more of the first through eighth aspects, the association pattern period is to be determined based at least in part on the scaling factor, a PRACH configuration period associated with an association period, and an integer value associated with the association period.

In a tenth aspect, alone or in combination with one or more of the first through ninth aspects, the association pattern period is to be determined such that a pattern between PRACH occasions and synchronization signal blocks repeats at an amount of time that is equal to or less than a product of a fixed time value and the scaling factor.

In an eleventh aspect, alone or in combination with one or more of the first through tenth aspects, the fixed time value is 160 milliseconds.

In a twelfth aspect, alone or in combination with one or more of the first through eleventh aspects, the scaling factor is signaled to the UEF entity via at least one of: remaining minimum system information; other system information; downlink control information; a medium access control (MAC) control element; radio resource control signaling; or a handover command.

In a thirteenth aspect, alone or in combination with one or more of the first through twelfth aspects, the scaling factor is used in association with orthogonalizing RACH occasions across adjacent hops of a backhaul network.

Figure 10:
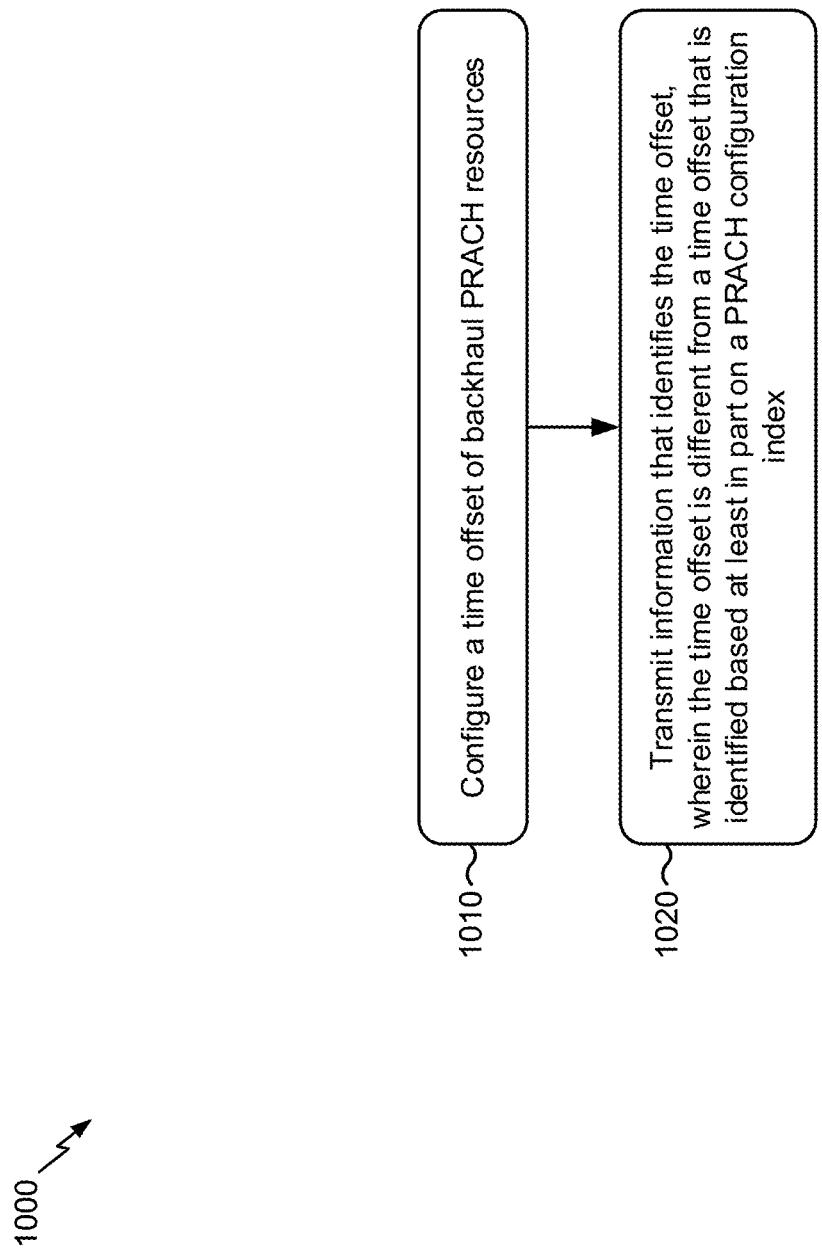
FIG. 10 is a diagram illustrating an example process performed, for example, by an ANF entity, in accordance with various aspects of the present disclosure.

FIG. 10 is a diagram illustrating an example process 1000 performed, for example, by an ANF entity, in accordance with various aspects of the present disclosure. Example process 1000 is an example where a wireless communication device (e.g., base station 110 with ANF) configures a time offset of backhaul PRACH resources, and transmits information that identifies the time offset.

As shown in FIG. 10, in some aspects, process 1000 may include configuring a time offset of backhaul PRACH resources (block 1010). For example, the wireless communication device (e.g., using controller/processor 240, and/or the like), may configure a time offset of backhaul PRACH resources, as described above.

As shown in FIG. 10, in some aspects, process 1000 may include transmitting information that identifies the time offset (block 1020). For example, the wireless communication device (e.g., using antenna 234, transmit processor 220, controller/processor 240, and/or the like), may transmit information that identifies the time offset, as described above. In some aspects, the time offset may be different from a time offset that is identified based at least in part on a PRACH configuration index Process 1000 may include additional aspects, such as any single aspect or any combination of aspects described below and/or in connection with one or more other processes described elsewhere herein.

In a first aspect, the time offset includes a subframe level offset.

In a second aspect, alone or in combination with the first aspect, the subframe level offset is in a range from 0 to 127.

In a third aspect, alone or in combination with one or more of the first and second aspects, the time offset includes a slot level offset.

In a fourth aspect, alone or in combination with one or more of the first through third aspects, the slot level offset is in a range from 0 to 39.

In a fifth aspect, alone or in combination with one or more of the first through fourth aspects, the slot indexing is defined in terms of 60 kilohertz (kHz) numerology.

In a sixth aspect, alone or in combination with one or more of the first through fifth aspects, the slot level offset is in a range from 0 to 9.

In a seventh aspect, alone or in combination with one or more of the first through sixth aspects, the slot indexing is defined in terms of 15 kilohertz (kHz) numerology.

In an eighth aspect, alone or in combination with one or more of the first through seventh aspects, the time offset is used to time division multiplex random access channel (RACH) resources across adjacent hops of a backhaul network.

In a ninth aspect, alone or in combination with one or more of the first through eighth aspects, the time offset is signaled via at least one of: remaining minimum system information; other system information; downlink control information; a medium access control (MAC) control element; radio resource control signaling; or a handover command.

In a tenth aspect, alone or in combination with one or more of the first through ninth aspects, the time offset is used in association with orthogonalizing RACH occasions across adjacent hops of a backhaul network.

In an eleventh aspect, alone or in combination with one or more of the first through tenth aspects, the time offset is in a range from zero to a periodicity of the backhaul PRACH resources.

In a twelfth aspect, alone or in combination with one or more of the first through eleventh aspects, the time offset overrides the time offset that is identified based at least in part on the PRACH configuration index.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
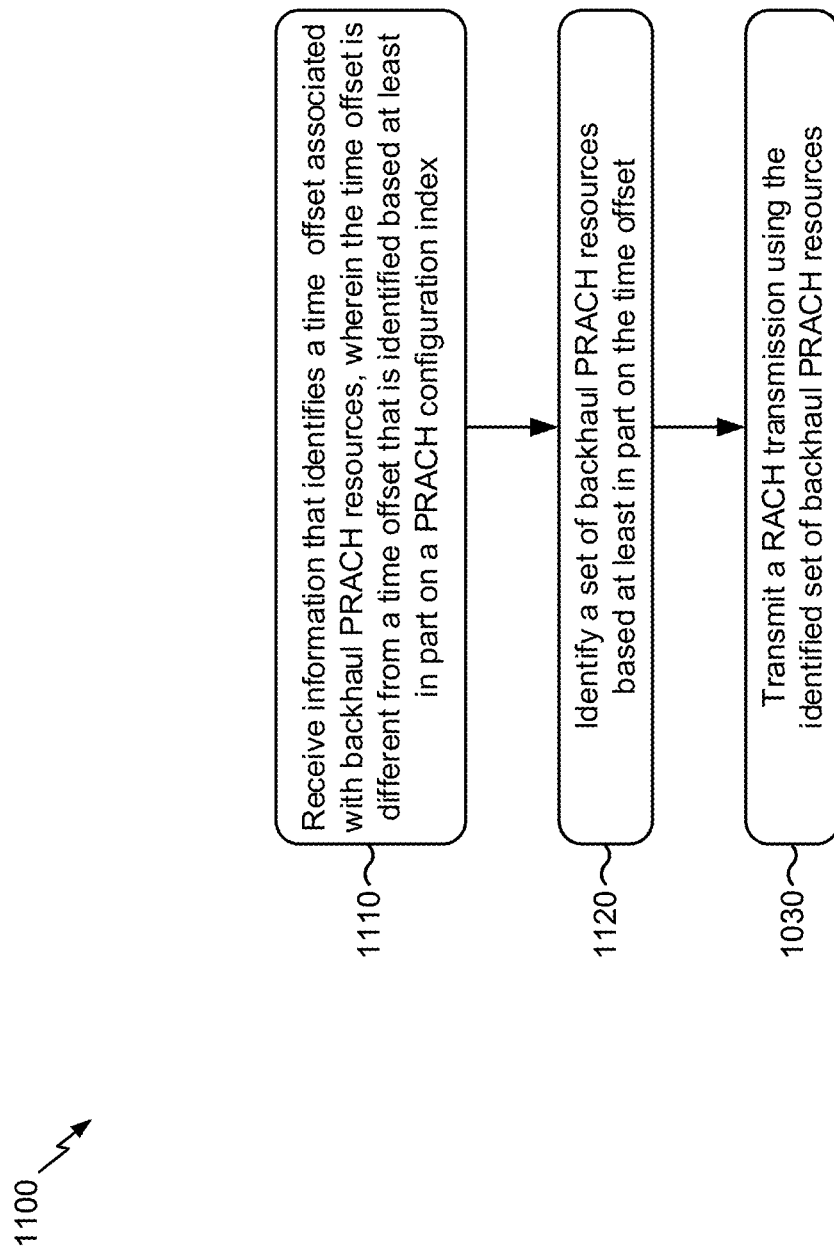
FIG. 11 is a diagram illustrating an example process performed, for example, by a UEF entity, in accordance with various aspects of the present disclosure.

FIG. 11 is a diagram illustrating an example process 1100 performed, for example, by a UEF entity, in accordance with various aspects of the present disclosure. Example process 1100 is an example where a UEF entity (e.g., base station 110 with UEF, UE 120) identifies a set of backhaul PRACH resources based at least in part on a time offset and transmits a RACH transmission using the identified set of PRACH resources.

As shown in FIG. 11, in some aspects, process 1100 may include receiving information that identifies a time offset associated with backhaul PRACH resources (block 1110). For example, the UEF entity (e.g., using antenna 234/252, receive processor 238/258, controller/processor 240/280, and/or the like), receiving information that identifies a time offset associated with backhaul PRACH resources, as described above. In some aspects, the time offset may be different from a time offset that is identified based at least in part on a PRACH configuration index As shown in FIG. 11, in some aspects, process 1100 may include identifying a set of backhaul PRACH resources based at least in part on the time offset (block 1120). For example, the UEF entity (e.g., using controller/processor 240/280, and/or the like), may identify a set of backhaul PRACH resources based at least in part on the time offset, as described above.

As shown in FIG. 11, in some aspects, process 1100 may include transmitting a RACH transmission using the identified set of back backhaul PRACH resources (block 1130). For example, the UEF entity (e.g., using antenna 234/252, transmit processor 220/264, controller/processor 240/280, and/or the like), may transmit a RACH transmission using the identified set of back backhaul PRACH resources, as described above.

Process 1100 may include additional aspects, such as any single aspect or any combination of aspects described below and/or in connection with one or more other processes described elsewhere herein.

In a first aspect, the time offset includes a subframe level offset.

In a second aspect, alone or in combination with the first aspect, the subframe level offset is in a range from 0 to 127.

In a third aspect, alone or in combination with one or more of the first and second aspects, the time offset includes a slot level offset.

In a fourth aspect, alone or in combination with one or more of the first through third aspects, the slot level offset is in a range from 0 to 39.

In a fifth aspect, alone or in combination with one or more of the first through fourth aspects, the slot indexing is defined in terms of 60 kilohertz (kHz) numerology.

In a sixth aspect, alone or in combination with one or more of the first through fifth aspects, the slot level offset is in a range from 0 to 9.

In a seventh aspect, alone or in combination with one or more of the first through sixth aspects, the slot indexing is defined in terms of 15 kilohertz (kHz) numerology.

In an eighth aspect, alone or in combination with one or more of the first through seventh aspects, the time offset is used to time division multiplex random access channel (RACH) resources across adjacent hops of a backhaul network.

In a ninth aspect, alone or in combination with one or more of the first through eighth aspects, the time offset is signaled to the UEF entity via at least one of: remaining minimum system information; other system information; downlink control information; a medium access control (MAC) control element; radio resource control signaling; or a handover command.

In a tenth aspect, alone or in combination with one or more of the first through ninth aspects, the time offset is used in association with orthogonalizing RACH occasions across adjacent hops of a backhaul network.

In an eleventh aspect, alone or in combination with one or more of the first through tenth aspects, the time offset is in a range from zero to a periodicity of the backhaul PRACH resources.

In a twelfth aspect, alone or in combination with one or more of the first through eleventh aspects, the time offset overrides the time offset that is identified based at least in part on the PRACH configuration index.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by an access node functionality (ANF) entity, comprising:
    configuring a time offset of backhaul physical random access channel (PRACH) resources;
    configuring a scaling factor associated with a periodicity of the backhaul PRACH resources,
        wherein the periodicity of the backhaul PRACH resources is determined based at least in part on multiplying the scaling factor and a periodicity of PRACH resources associated with a PRACH configuration index; and
    transmitting information that identifies the time offset and the scaling factor,
        wherein the time offset is different from another time offset that is identified based at least in part on the PRACH configuration index.

2. The method of claim 1, wherein the time offset includes a subframe level offset.

3. The method of claim 2, wherein the subframe level offset is in a range from 0 to 127.

4. The method of claim 1, wherein the time offset includes a slot level offset.

5. The method of claim 4, wherein the slot level offset is in a range from 0 to 39.

6. The method of claim 5, where slot indexing is defined in terms of 60 kilohertz (kHz) numerology.

7. The method of claim 4, wherein the slot level offset is in a range from 0 to 9.

8. The method of claim 7, where slot indexing is defined in terms of 15 kilohertz (kHz) numerology.

9. The method of claim 1, wherein the time offset is used to time division multiplex random access channel (RACH) resources across adjacent hops of a backhaul network.

10. The method of claim 1, wherein the time offset is signaled via at least one of:
    remaining minimum system information;
    other system information;
    downlink control information;
    a medium access control (MAC) control element;
    radio resource control signaling; or
    a handover command.

11. The method of claim 1, wherein the time offset is used in association with orthogonalizing RACH occasions across adjacent hops of a backhaul network.

12. The method of claim 1, wherein the time offset is in a range from zero to the periodicity of the backhaul PRACH resources.

13. The method of claim 1, wherein the time offset overrides the other time offset.

14. An access node functionality (ANF) entity for wireless communication comprising:
    memory; and
    one or more processors operatively coupled to the memory, the memory and the one or more processors configured to:
        configure a time offset of backhaul physical random access channel (PRACH) resources;
        configure a scaling factor associated with a periodicity of the backhaul PRACH resources,
            wherein the periodicity of the backhaul PRACH resources is determined based at least in part on multiplying the scaling factor and a periodicity of PRACH resources associated with a PRACH configuration index; and
        transmit information that identifies the time offset and the scaling factor,
            wherein the time offset is different from another time offset that is identified based at least in part on the PRACH configuration index.

15. The ANF entity of claim 14, wherein the time offset is signaled via at least one of:
    remaining minimum system information;
    other system information;
    downlink control information;
    a medium access control (MAC) control element;
    radio resource control signaling; or
    a handover command.

16. A method of wireless communication performed by a user equipment functionality (UEF) entity, comprising:
    receiving information that identifies a first time offset associated with backhaul physical random access channel (PRACH) resources and a scaling factor associated with a first periodicity of the backhaul PRACH resources,
        wherein the first time offset is different from a second time offset that is identified based at least in part on a PRACH configuration index;

determining the first periodicity based at least in part on multiplying the scaling factor and a second periodicity of PRACH resources associated with the PRACH configuration index;

identifying a set of backhaul PRACH resources based at least in part on the first periodicity and the first time offset; and transmitting a RACH transmission using the identified set of backhaul PRACH resources.

17. The method of claim 16, wherein the first time offset includes a subframe level offset.

18. The method of claim 17, wherein the subframe level offset is in a range from 0 to 127.

19. The method of claim 16, wherein the first time offset includes a slot level offset.

20. The method of claim 19, wherein the slot level offset is in a range from 0 to 39.

21. The method of claim 20, where slot indexing is defined in terms of 60 kilohertz (kHz) numerology.

22. The method of claim 19, wherein the slot level offset is in a range from 0 to 9.

23. The method of claim 22, where slot indexing is defined in terms of 15 kilohertz (kHz) numerology.

24. The method of claim 16, wherein the first time offset is used to time division multiplex random access channel (RACH) resources across adjacent hops of a backhaul network.

25. The method of claim 16, wherein the first time offset is signaled to the UEF entity via at least one of:
remaining minimum system information;
other system information;
downlink control information;
a medium access control (MAC) control element;
radio resource control signaling; or
a handover command.

26. The method of claim 16, wherein the first time offset is used in association with orthogonalizing RACH occasions across adjacent hops of a backhaul network.

27. The method of claim 16, wherein the first time offset is in a range from zero to the first periodicity.

28. The method of claim 16, wherein the first time offset overrides the second time offset.

29. A user equipment functionality (UEF) entity for wireless communication comprising:
memory; and
one or more processors operatively coupled to the memory, the memory and the one or more processors configured to:
receive information that identifies a time offset associated with backhaul physical random access channel (PRACH) resources and a scaling factor associated with a first periodicity of the backhaul PRACH resources;
determine the first periodicity based at least in part on multiplying the scaling factor and a second periodicity of PRACH resources associated with a PRACH configuration index;
identify a set of backhaul PRACH resources based at least in part on the first periodicity and the time offset; and
transmit a RACH transmission using the identified set of backhaul PRACH resources.

30. The UEF of claim 29, wherein the time offset is signaled to the UEF entity via at least one of:
remaining minimum system information;
other system information;
downlink control information;
a medium access control (MAC) control element;
radio resource control signaling; or
a handover command.

* * * * *